United States Patent [19]
Harlan et al.

[11] Patent Number: 5,462,123
[45] Date of Patent: Oct. 31, 1995

[54] TILLAGE IMPLEMENT WITH ON-THE-GO DEPTH CONTROL OF ANGLE ADJUSTABLE DISC GANGS

[75] Inventors: Robert D. Harlan, Hanover; Donald R. Landoll, Marysville, both of Kans.

[73] Assignee: Landoll Corporation, Marysville, Kans.

[21] Appl. No.: 13,000

[22] Filed: Feb. 3, 1993

[51] Int. Cl.⁶ .................................................. A01B 63/32
[52] U.S. Cl. .................. 172/454; 172/583; 172/584; 172/600; 172/675; 172/692; 172/744
[58] Field of Search .................. 172/454, 455, 172/583, 584, 599, 600, 675, 692, 734, 742, 744, 138

[56] References Cited

U.S. PATENT DOCUMENTS

| 114,707 | 5/1871 | Pond | 172/584 X |
|---|---|---|---|
| D. 339,358 | 9/1993 | Van Mill et al. | D15/27 |
| 2,797,542 | 7/1957 | Webster et al. | 172/455 X |
| 3,131,775 | 5/1964 | Long | 172/583 X |
| 4,186,805 | 2/1980 | Repski | 172/248 |
| 4,454,920 | 6/1984 | Dietrich, Sr. | 172/454 X |
| 4,546,832 | 10/1985 | Dietrich, Sr. et al. | 172/260.5 |
| 4,615,396 | 10/1986 | Arnold | 172/138 |
| 5,082,064 | 1/1992 | Landoll et al. | 172/583 X |
| 5,156,216 | 10/1992 | Van Mill | 172/138 |

FOREIGN PATENT DOCUMENTS 133697  3/1960  U.S.S.R. ........................... 172/742

OTHER PUBLICATIONS

Brillon Landcommander "Advertising Brochure" Take Command of Tillage Problems (2 pages).
Turbo–Champ "Advertising Brochure" Complete, One-pass Convservation tillage Tool for Big 2/W Drive Tractors (4 pages).
Turbo–Tiger "Advertising Brochure" A new Better Way . . . Aggressive One–Pass Tillage (4 pages).
Operator's Manual "McCormick International 468 Cultivator" (7 pages).

Primary Examiner—Randolph A. Reese
Assistant Examiner—Christopher J. Novosad
Attorney, Agent, or Firm—Hovey, Williams, Timmons & Collins

[57] ABSTRACT

The working depth of obliquely angled disc gangs on the implement can be readily adjusted from the tractor seat with a single hydraulic cylinder through the use of mechanical linkage that couples the hydraulic cylinder with all of the disc gangs for simultaneous movement. Special pivots that join the gangs to the main frame permit the gangs to be manually angled adjusted without affecting depth, and vice-versa, while quick-release locks securely hold the gangs in their selected angular positions yet permit rapid adjustment.

23 Claims, 4 Drawing Sheets

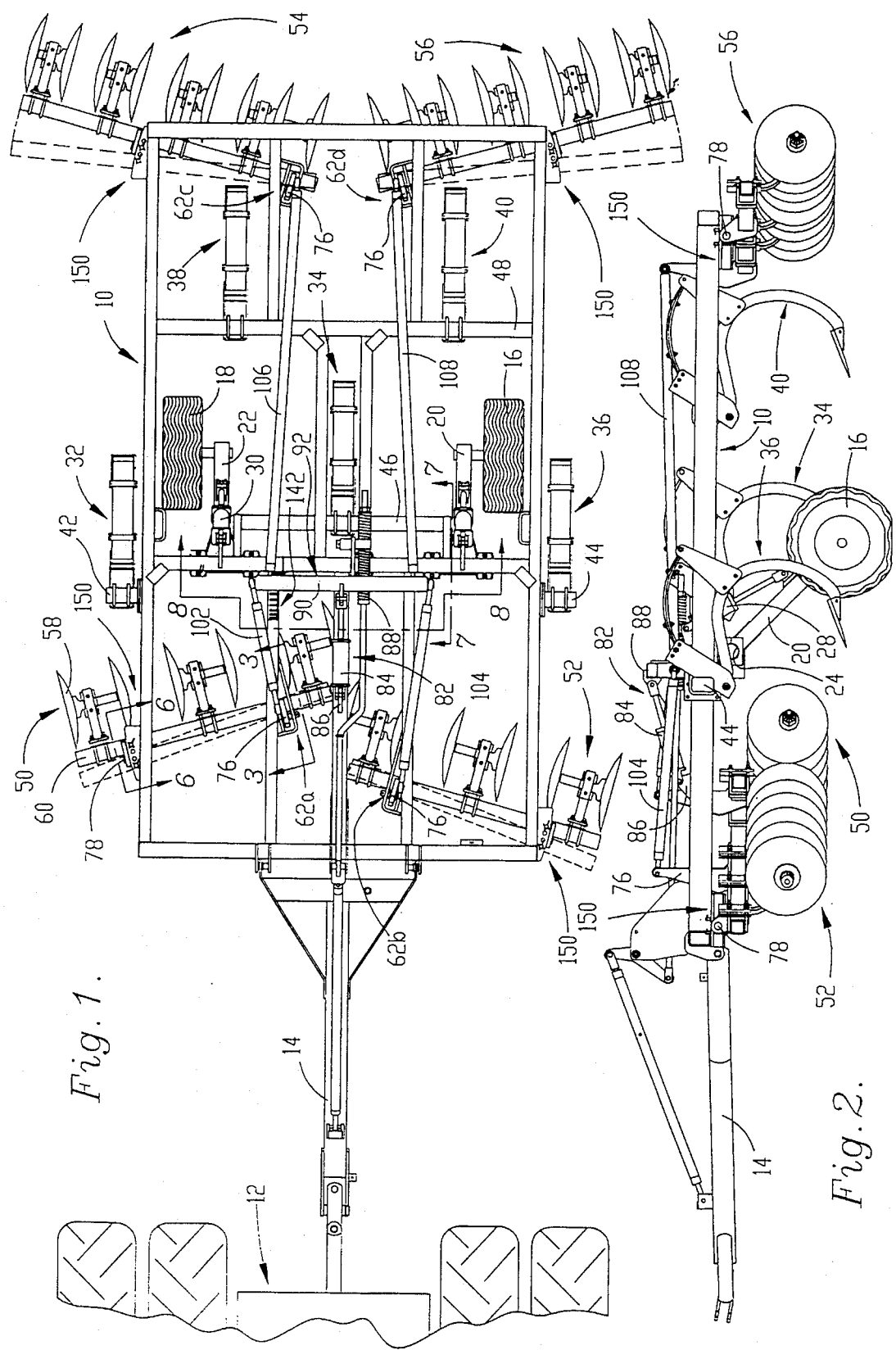

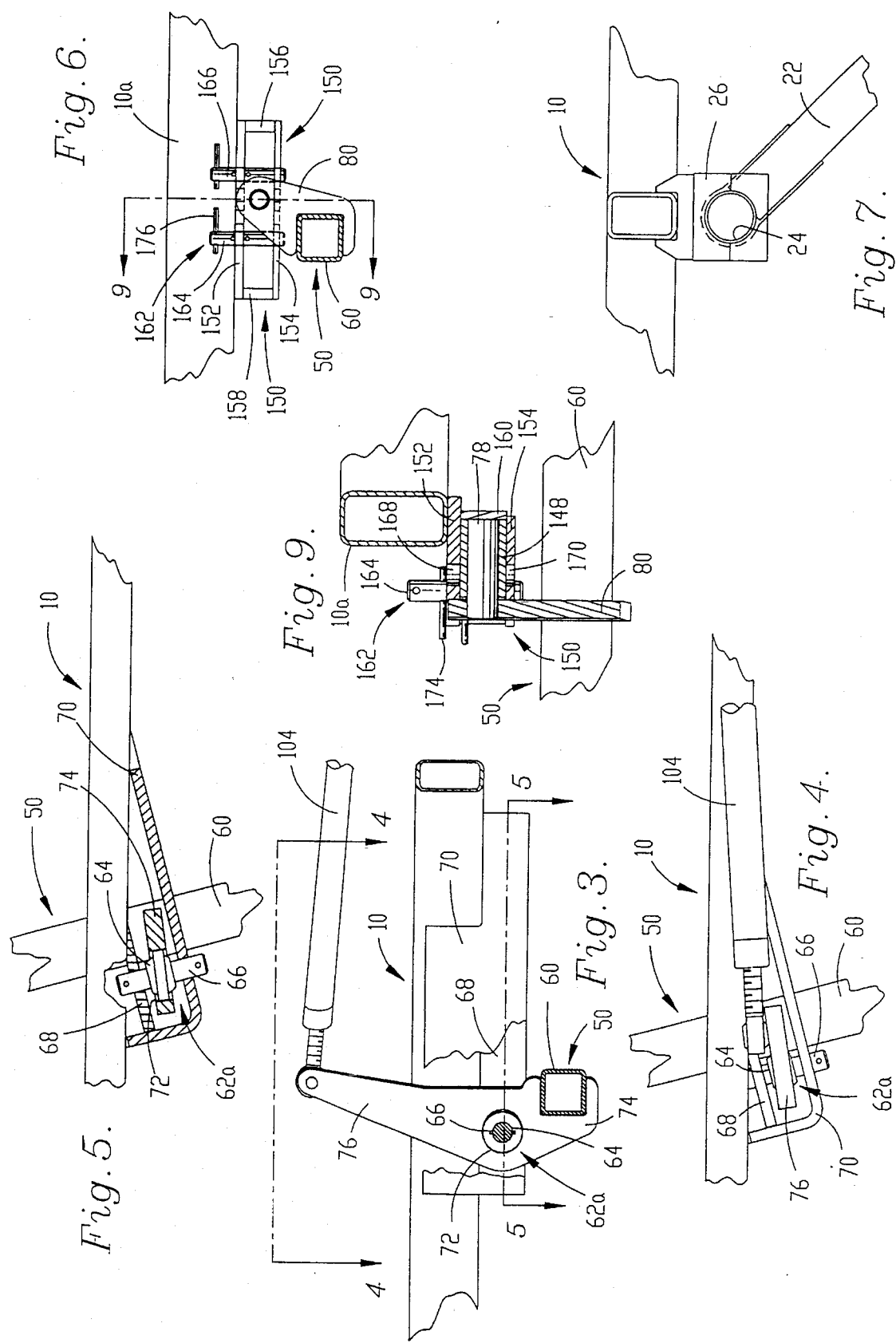

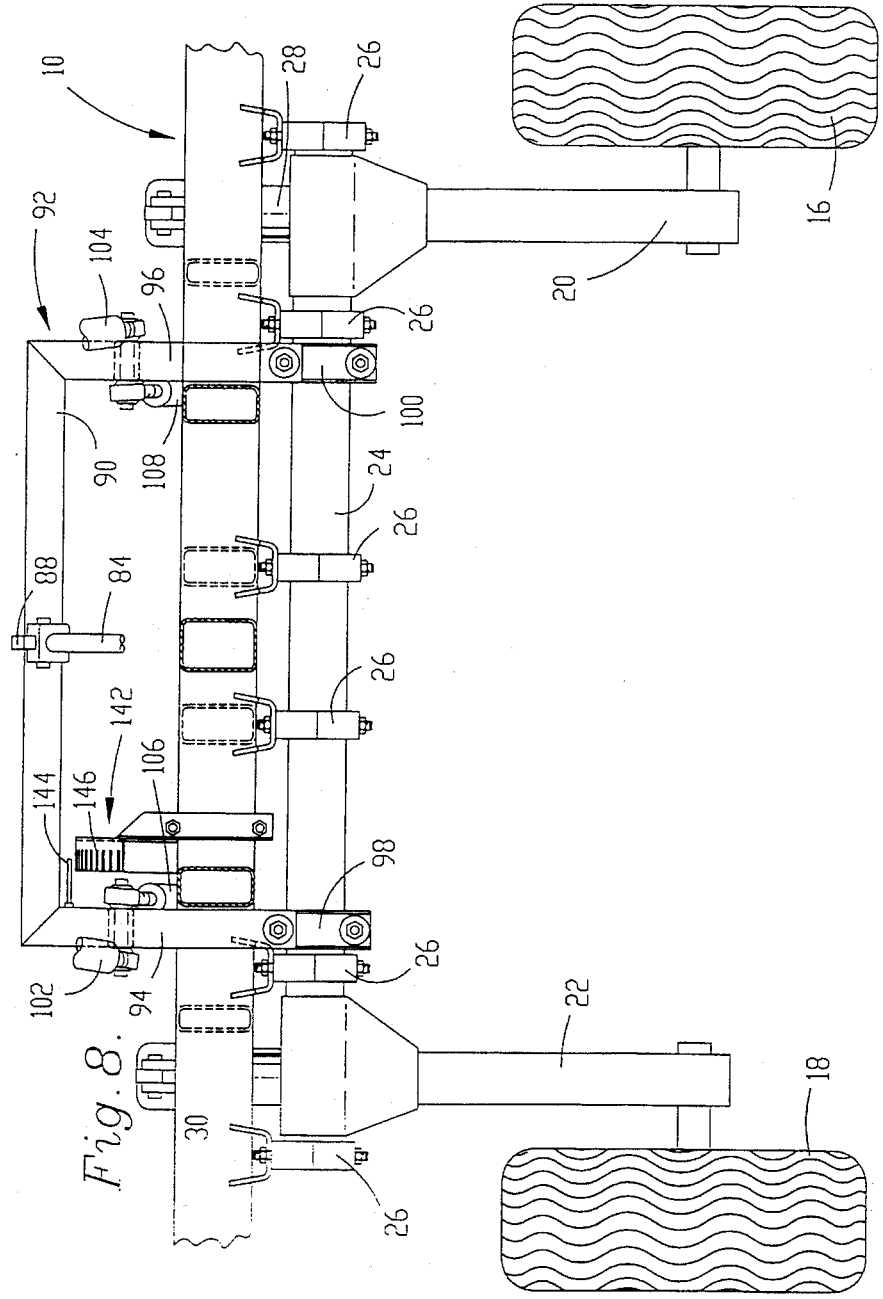
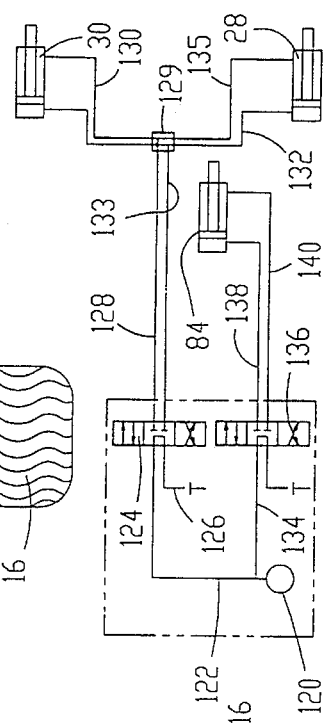
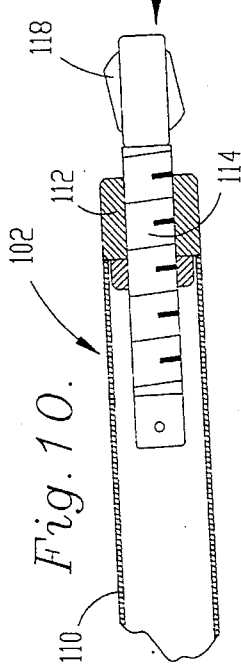

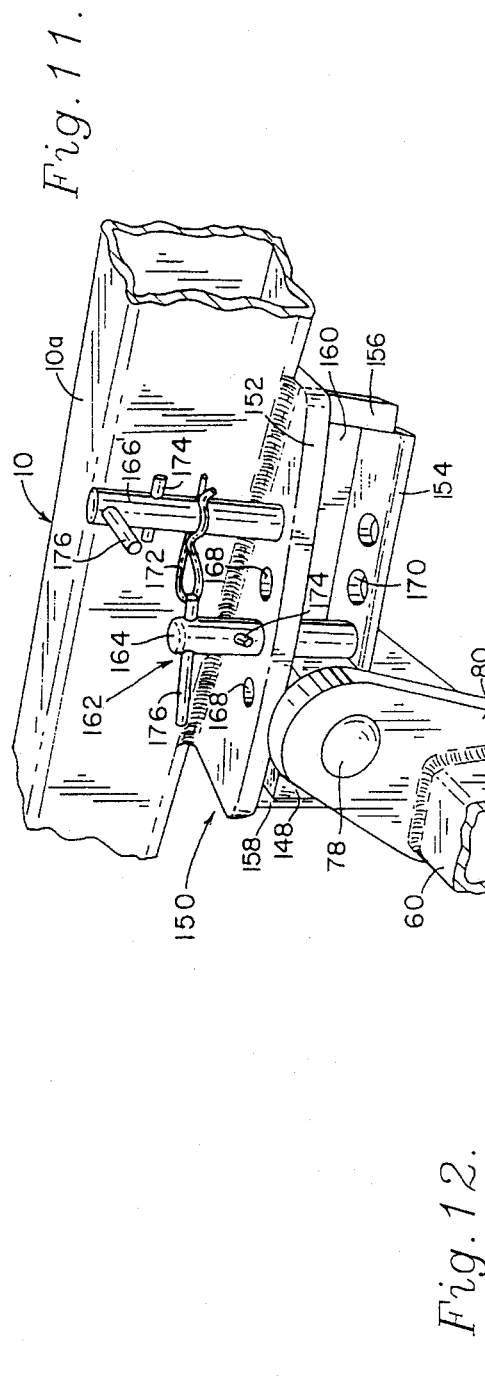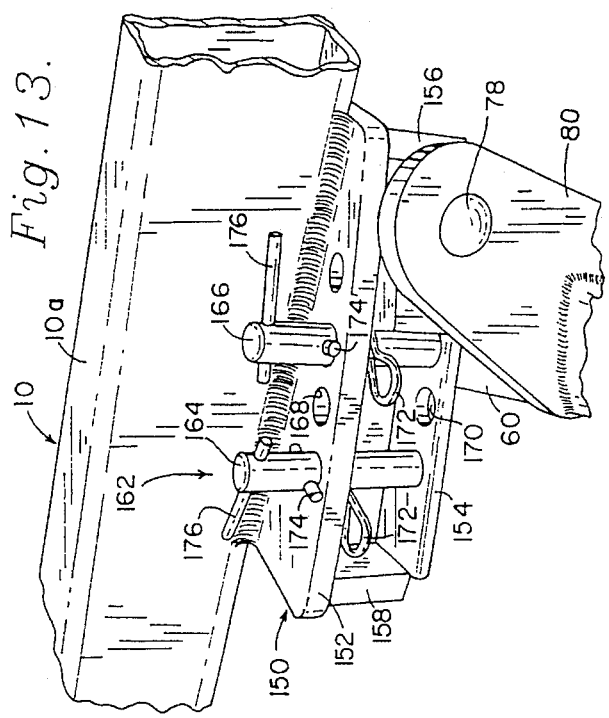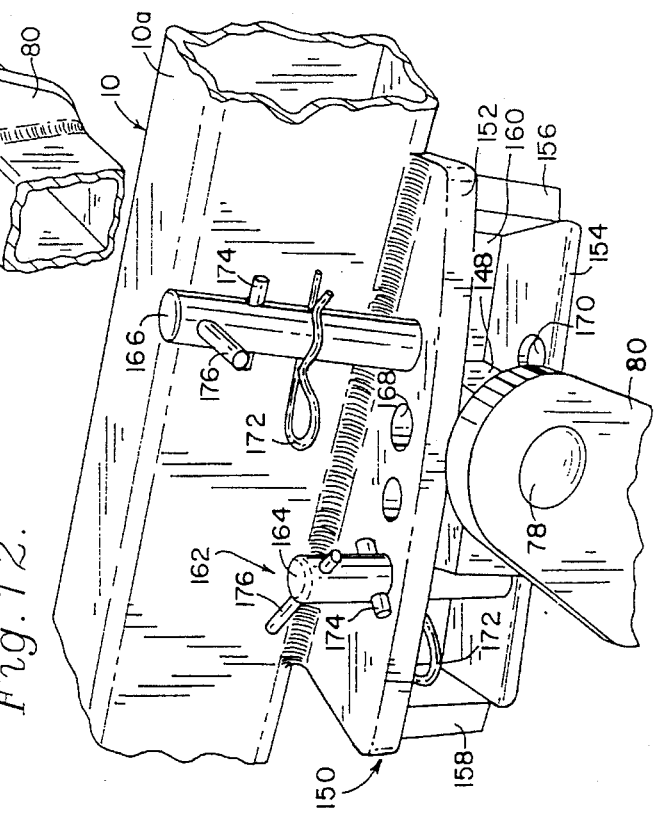

TILLAGE IMPLEMENT WITH ON-THE-GO DEPTH CONTROL OF ANGLE ADJUSTABLE DISC GANGS

TECHNICAL FIELD

This invention relates to tillage implements and, more particularly, to machines in which the depth of penetration of the disc gangs and their angle of attack may be adjusted on-the-go from the seat of the towing tractor.

BACKGROUND

In U.S. Pat. No. 5,082,064 assigned to the assignee of the present invention there is disclosed a tillage implement in which the obliquely angled disc gangs can be both depth adjusted relative to the main horizontal frame of the machine and angle adjusted in a fore-and-aft sense to change the angle of attack of the discs as they engage the soil, cutting up residue and turning under the materials to the extent desired. However, both the depth and angle adjustments must be carried out manually when the machine is stopped, which adds a degree of inconvenience for the operator.

SUMMARY OF THE PRESENT INVENTION

Accordingly, one important object of the present invention is to provide a tillage implement in which the depth of penetration of the disc gangs can be adjusted on-the-go from the tractor seat so the operator can conveniently and instantly make changes in the amount of residue being turned over and worked into the soil by the disc gangs. Furthermore, it is an important object of the invention to provide such on-the-go depth adjustment along with the ability to change the oblique angle of attack of the disc gangs without inhibiting the ability to expeditiously accomplish depth adjustment. Similarly, it is an important object of the invention to permit quick and easy angle adjustment of the gangs without causing a concurrent change in the depth positioning of those units.

Another important consideration of the present invention is to provide for the desired flexibility in adjustment of the disc gangs in a machine which also provides for deep tillage through an additional set of deep tilling shanks or the like. In this type of construction, while the shanks are essentially rigidly affixed to the main frame of the machine, the disc gangs are rendered adjustable relative to such frame, both in a fore-and-aft angular sense and in an up-and-down vertical sense for depth adjustment purposes.

In accomplishing the foregoing objectives, the present invention contemplates having each gang of discs mounted on its own independent, transverse beam that is carried by a special self-aligning pivot or bushing at its inner end so as to not only permit the outer end of the beam to be swung fore-and-aft for angle adjustment purposes, but also to permit the beam to be rocked up and down about a horizontal axis for depth adjustment of the discs associated with the beam. A single hydraulic actuator on the machine may be operated remotely from the tractor seat to accomplish the requisite raising and lowering of the disc gangs for depth adjustment, each of such gangs being mechanically linked with the single actuator through an independently adjustable turnbuckle so that while all of the gangs are operated in unison, they may each be calibrated or adjusted slightly relative to one another by independent manipulation of their respective turnbuckles. A simple, yet effect pin and aperture arrangement at the outer end of each disc gang cooperates with a sliding guide block which carries the outer horizontal pivot for the beam so as to releasably lock the beam in its selected position of angular adjustment.

BRIEF DESCRIPTION OF THE DRAWINGS

FIG. 1 is a top plan view of a tillage implement constructed in accordance with the principles of the present invention, with phantom lines illustrating alternative positions of the obliquely disposed disc gangs of the machine;

FIG. 2 is a side elevational view of the machine with the frame fully raised into an over-the-road transport position such that all discs and tillage shanks are fully up out of the ground;

FIG. 3 is an enlarged, fragmentary, cross-sectional view, taken substantially along line 3—3 of FIG. 1, of the inner pivot end of the right front disc gang showing details of construction with parts broken away for clarity;

FIG. 4 is an enlarged, fragmentary top plan view of the inner pivot end of the right front disc gang of the machine taken substantially along line 4—4 of FIG. 3;

FIG. 5 is a fragmentary horizontal cross-sectional view through the inner pivot end of the right front disc gang taken substantially along line 5—5 of FIG. 3;

FIG. 6 is an enlarged, fragmentary vertical cross-sectional view adjacent the outer end of the right front gang assembly illustrating the manner in which the gang is held in a selected position of angular adjustment;

FIG. 7 is an enlarged, fragmentary vertical cross-sectional view through the wheel arm mounting structure of the machine taken substantially along line 7—7 of FIG. 1;

FIG. 8 is an enlarged, fragmentary vertical cross-sectional view through the machine looking generally rearwardly through the center of the machine along line 8-8 of FIG. 1;

FIG. 9 is an enlarged, fragmentary vertical cross-sectional view through the angle locking means of the right front gang assembly taken substantially along line 9—9 of FIG. 6;

FIG. 10 is an enlarged, fragmentary detail view of a typical turnbuckle associated with the depth adjustment mechanism of the machine;

FIG. 11 is a fragmentary, right front perspective view of the angle locking means for the right front disc gang of the machine showing the disc gang in its rearmost position of adjustment;

FIG. 12 is a fragmentary, perspective view of the angle locking means similar to FIG. 11, but showing the disc gang in an intermediate adjusted position;

FIG. 13 is a perspective view of the angle locking means similar to FIGS. 11 and 12, but showing the disc gang in its fully forwardmost position of adjustment; and FIG. 14 is a schematic diagram of the hydraulic control circuit of the implement.

DETAILED DESCRIPTION

The implement illustrated in the drawings has a flat, rectangular main frame 10 that is normally maintained in a horizontal condition and is adapted for connection to a towing vehicle 12 by a fore-and-aft extending tongue 14. A pair of ground wheels 16 and 18 are coupled with the frame 10 so as to support the latter for over-the-road travel. The wheels 16,18 may also be raised and lowered with respect to the frame 10 so as to change the height of the latter above the ground, and thus also change the working depth of certain of the tillage tools carried by the frame 10, as will subsequently be seen.

Each of the wheels 16,18 is carried by the lower, rear end of a corresponding wheel arm 20 or 22, such arms 20,22 being, in turn, rigidly affixed to a transversely extending torque tube 24 (FIG. 8) which is rotatably supported beneath the frame 10 by a series of six pillow blocks 26. The two wheel arms 20,22 are rigidly affixed to opposite ends of the torque tube 24 so that the arms 20,22 are constrained to move in unison. A pair of double-acting hydraulic cylinders 28 and 30 (FIGS. 1 and 14) are connected between the frame and respective ones of the wheel arms 20,22 for raising and lowering the wheels 16,18 relative to the frame 10.

The frame 10 carries five deep tillage shank assemblies 32,34,36,38, and 40 for removing lower compaction zones and providing subsoiling slots that encourage the entry and penetration of moisture into the subsoil. The shank assemblies 32–40 may take a variety of different forms, as well understood by those skilled in the art, but are, in each case, attached at constant depth positions to the frame 10 with the exception of being spring loaded so as to permit yielding of the shanks upwardly in the event of encountering strong obstructions. In the illustrated embodiment, two front shank assemblies 32 and 36 are secured to laterally outwardly projecting beam stubs 42 and 44 (FIGS. 1 and 2) adjacent the center of the machine, the shank assembly 34 is secured to a transverse beam 46 of the frame near the lateral center thereof just behind the shanks 32 and 36, and the shanks 38 and 40 are secured to another cross beam 48 of the frame 10 in the rear portion of the machine, the shanks 38 and 40 being interspersed laterally between the shanks 32,34, and 36 so that essentially the entire width of the frame is provided with deep tillage tools.

In addition to the deep tillage shanks 32–40, the machine is provided with four disc gangs 50,52,54, and 56. The two front disc gangs 50 and 52 project laterally outwardly and forwardly from the centerline of the machine at opposite oblique angles, while the two rear disc gangs 54 and 56 project laterally outwardly and rearwardly from the center of the machine at oblique angles. Preferably, the two front gangs 50,52 are staggered in a fore-and-aft sense, with the inner end of the right front gang 50 rearwardly overlapping the corresponding inner end of the left front gang 52. On the other hand, the rear gangs 54 and 56 do not overlap and in fact are spaced slightly apart along the fore-and-aft centerline of the machine.

Taking the gang 50 as an example, it will be seen that each of the gangs includes a series of concavo-convex discs 58 supported on and along a beam 60 of rectangular, tubular cross-section. All of the discs 58 in each gang are located rearwardly of and below the corresponding beam 60 and are supported for rotation about a common axis extending parallel to the longitudinal axis of the beam 60. The discs 58 of the front gangs 50 and 52 have their concave faces directed outwardly so as to throw soil in opposite outward directions as the gangs 50,52 move through the field, while the discs 58 of the rear gangs 54,56 have their concave faces directed inwardly so as to throw soil back toward the center as those gangs work the field. As noted best in FIG. 1, the innermost discs 58 of the two front gangs 50,52 are disposed in lateral overlapping relationship to one another, so as to prevent the formation of a ridge in the soil along the center of the machine.

Again using the right front gang 50 as an example, a special inboard pivot assembly 62 connects the inner end of the gang 50 to the underside of the frame 10 in a manner that permits both up and down adjustment of the beam 60 relative to the frame 10 for depth adjustment purposes, and also fore-and-aft adjustable swinging of the beam 60 for angle adjustment purposes. In addition to FIG. 1, such pivot assembly 62 is particularly illustrated in FIGS. 3, 4, and 5.

Each inboard pivot assembly 62 includes a spherical bushing assembly 64 that receives a short, horizontally extending pivot shaft 66 disposed at an oblique angle to the fore-and-aft longitudinal axis of the machine. For the sake of clear identification, the inboard pivot assembly for the gang 50 will be designated by the numeral 62a, the inboard pivot assembly for the left front gang 52 by the numeral 62b, the inboard pivot assembly for the right rear gang 54 by the numeral 62c, and the inboard pivot assembly for the left rear gang 56 by the designation 62d. It will be seen, therefore, that the pivot shaft 66 of the right front pivot assembly 62a projects outwardly and forwardly in generally the same direction as the corresponding gang 50, the pivot shaft 66 for the left front assembly 62b projects leftwardly outwardly and forwardly generally in the same direction as the gang 52, the pivot shaft 66 for the right rear gang 54 projects rightwardly outwardly and rearwardly generally in the same direction of the gang 54, and the pivot shaft 66 for the left rear pivot assembly 62d projects leftwardly outwardly and rearwardly generally in the same direction as the gang 56.

As illustrated with respect to the right front gang 50, each of the inboard pivot assemblies 62 is supported by a pair of fore-and-aft, diagonally extending, upright and laterally spaced apart mounting plates 68 and 70 that are rigidly affixed to a fore-and-aft member of the frame 10. As viewed from the top in FIGS. 4 and 5, it will be seen that the larger plate 70 is generally L-shaped, while the shorter plate 68 is completely straight, both of the mounting plates 68,70 having portions thereof which extend below the level of the frame 10 so as to support the inboard pivot assembly 62 in an underslung position with respect to the frame 10 as illustrated, for example, in FIG. 3, wherein it will be noted that the axis of the pivot shaft 66 is located below the lower extremity of the proximal frame member.

Each of the spherical bushings 64 is received within the mounting hole 72 on a lug 74 that is rigidly affixed to the corresponding beam 60 and projects upwardly therefrom. Each lug 74 thus disposes its corresponding beam 60 slightly rearwardly of and below the corresponding pivot shaft 66 so that the beam 60 is positioned in a cranked or eccentric relationship with the pivot axis defined by the shaft 66. Each lug 74 is integral with an upstanding, tall crank arm 76 that projects up past the pivot shaft 66 and beyond the frame 10 as a means for receiving input motion intended to rock the beams 60 up or down about their respective pivots 66 to thus change the depth of the gangs 50–56. As will be described hereinafter in greater detail, each of the beams 60 is also pivotally supported closer to its outer end by a second horizontal pivot 78 that is aligned with the axis of the spherical bushing 64. A second depending lug 80 associated with the outer pivot 78 is fixed to the beam 60 in the same manner as the lug 74 so as to assist in cranking the beam 60 up or down about the common axis provided by the inner pivot 62 and the outer pivot 78 when rocking power is supplied to the upstanding crank arm 76.

The gangs 50–56 are raised and lowered relative to the frame 10 by depth control mechanism broadly denoted by the numeral 82 in FIG. 1 and comprising as a primary component thereof a double-acting hydraulic piston and cylinder assembly 84. The piston and cylinder assembly 84 comprises the primary actuator of the control mechanism 82 and is intended to be actuated remotely from the seat of the tractor 12 via a hydraulic circuit, as will be subsequently described.

As illustrated in FIGS. 1 and 2, the hydraulic cylinder 84 has its forward anchor end secured via a lug 86 to a fore-and-aft member of the frame 10, while its rear, telescoping rod end is secured via another lug 88 to the horizontal bight 90 of an inverted, generally U-shaped, motion transmitting device 92 (see also FIG. 8). In addition to the bight 90, the motion transmitting device 92 also has a pair of upright legs 94 and 96 which are rigidly affixed to the bight 90 at opposite ends thereof and project down into position along side of the torque tube 24 associated with the ground wheels 16,18. At that location, the lower ends of the legs 94,96 are clamped onto the torque tube 24 in a swiveling manner by respective clamps 98,100 (FIG. 8) so that the motion transmitting device 92 can be rocked fore-and-aft by the hydraulic cylinder 84 about a transverse axis defined by the torque tube 24.

In order to transfer the rocking motion of the device 92 to the four gangs 50–56, the depth control mechanism 82 further includes four separate push-pull links 102,104,106, and 108 for the gangs 50–56, respectively. The two front links 102 and 104 are pivotally connected at their rear ends to the outer side margins of the respective upright legs 94 and 96 of device 92, while being pivotally connected at their respective forward ends to the tall crank arms 76 at their respective inner pivots 62a and 62b. See, for example, FIGS. 3 and 4. On the other hand, the rear links 106 and 108 are pivotally connected at their front ends to the inboard upright surfaces of the respective upright legs 94 and 96 of the device 92, while being pivotally connected at their rear ends to the tall cranks 76 at their respective inner pivot location 62c and 62d. Consequently, when hydraulic cylinder 84 is extended to rock the motion transmitting device 92 rearwardly, the front links 102 and 104 are pulled rearwardly to rock the front gangs 50,52 down toward the ground while the rear links 106 and 108 are simultaneously pushed rearwardly to rock the rear gangs 54 and 56 down toward the ground. On the other hand, when the hydraulic cylinder 84 is retracted to rock the motion transmitting device forwardly, the front links 102 and 104 are pushed forwardly to rock their gangs 50,52 up toward the frame 10, while the rear links 106 and 108 are simultaneously pulled forwardly to pull their rear gangs 54,56 up toward the frame 10. When the hydraulic cylinder 84 is held hydraulically against extension or retraction, the four gangs 50–56 are likewise held in a selected position of depth adjustment relative to the frame 10 against upward or downward movement.

Each of the links 102–108 may be in the nature of a turnbuckle so that each link can be slightly adjusted in length to calibrate the gangs 50–56 with respect to one another. Thus, the front gangs 50,52 may be set to dig slightly more deeply into the ground than the rear gangs 54,56, for example, even though all of the gangs rise and fall in unison upon actuation of the cylinder 84, and each one of the gangs may be independently depth adjusted relative to the other as may be necessary or desirable, depending upon a variety of conditions and circumstances.

FIG. 10 illustrates the turnbuckle construction using the right front link 102 as an example. It will be seen in this respect that the link 102 includes a main, tubular body 110 which has a nut 112 fixed thereto at each of the two opposite ends thereof. Each of the nuts 112 receives the threaded stem 114 of a connector 116 having a self-centering spherical bushing 118 therein which serves as part of the means for connecting the link 102 to the motion transmitting device 92. Preferably, the tubular body 110 is rectangular in cross-sectional configuration so as to provide four flat sides to facilitate gripping by a suitable wrench or other tool to rotate the body 110 relative to the stem 114 and thereby effectively extend or retract the stem 114 relative to the body 110, thus lengthening or shortening the link 102. Obviously, the connector stems at opposite ends of the tubular body 110 are oppositely threaded so that both stems are effectively extended in unison and retracted in unison, depending upon the direction of rotation of the body 110.

As illustrated in FIG. 14, the depth adjustment cylinder 84 is on a separate hydraulic circuit from the wheel lift cylinders 28 and 30. Thus, while the wheel lift cylinders 28,30 control the height of the frame 10 above the ground and are used for raising and lowering the machine between transport and working positions, the cylinder 84 is utilized for controlling the vertical position of the gangs 50–56 relative to the frame 10. As illustrated, both sets of cylinders utilize a common pump 120, but each has its own separate supply line from the pump 120. In this respect, it will be seen that a supply line 122 for the cylinders 28,30 leads from the pump 120 to a three-position valve 124 that is illustrated in FIG. 14 in a neutral position in which oil is trapped within the cylinders 28,30 and is prevented from dumping to the tank via discharge line 126. Another line 128 leading from the valve 124 to manifold 129 connects to lines 130 and 135, which in turn connect to the rod end of the cylinders 28 and 30. Another line 133 leads from the valve 124 to manifold 129 and is connected within manifold 129 to lines 131 and 132 which are connected to the ram end of the cylinders 28 and 30.

Concerning the depth adjustment cylinder 84, a supply line 134 leads from the pump 120 to a three-way selector valve 136 located on the tractor in conjunction with the selector valve 124. A line 138 leading from the valve 136 connects the latter with the ram end of the cylinder 84, while another line 140 connects the valve 136 with the rod end of the cylinder 84. Depending upon the selected position for the valve 136, the cylinder 84 may be held against extension or retraction, which is the condition illustrated in FIG. 14, or the cylinder may be extended or retracted to raise or lower the gangs relative to the frame 10.

FIGS. 1 and 8 show a visual indicator broadly denoted by the numeral 142 which the operator may observe from the tractor seat to determine the depth of the gangs 50–56 relative to the frame 10. As illustrated in FIG. 8, a peg 144 carried by the motion transmitting device 92 registers with gradient indicia 146 on an arched component attached to the frame 10 so as to show the operator at a glance the selected depth of the gangs relative to the frame 10.

In addition to depth adjustment relative to the frame 10, the gangs 50–56 can be manually angled adjusted fore-and-aft so as to vary their respective oblique angles with respect to the path of travel of the machine. Each of the inboard pivots 62a–62d presents an inner pivot point for the corresponding gang due to the self-aligning nature of the spherical bushing 64 used at that location. Further out on each of the gangs 50–56, the horizontal pivots 78 are supported in a manner that they can be shifted fore-and-aft so as to correspondingly swing the outer ends of the gangs fore-and-aft. FIGS. 6, 9 and 11–13 illustrate details of construction of the right front gang 50 in the vicinity of its outer pivot 78 as a typical representation of the corresponding construction at the other gangs 52,54 and 56.

With particular reference, then, to FIGS. 6, 9, and 11–13, it will be seen that the outer horizontal pivot 78 is rotatably received within a support block 148. The support block 148, in turn, is captured within a guide track 150 formed in part by a pair of vertically spaced, upper and lower plates 152 and 154 on opposite upper and lower sides of the block 148.

The generally triangular in plan upper plate 152 is welded to the bottom side of the adjacent fore-and-aft member 10a of frame 10 so as to rigidly affix the guide track 150 to the frame 10, and upright front and rear end walls 156 and 158, respectively, span the plates 152 and 154 to determine front and rear limits of the guide track 150. A vertically extending back wall 160 interconnects the top and bottom plates 152,154 and the end walls 156,158 along inboard margins thereof to provide a closure for the inner extent of the track 150 while the outer extent thereof is left open to permit reception of the pivot 78.

The support block 148 may thus be selectively moved back and forth within the guide track 150 between the two extreme positions illustrated in FIGS. 11 and 13, the FIG. 11 position being the rearmost position for the block 148 in which it is against the rear wall 158, and the FIG. 13 position being the forwardmost position for the block 148 in which it is against the front wall 156. Means for releasably retaining the block 148 in either of those positions, or a third intermediate position therebetween as illustrated in FIG. 12, is broadly denoted by the numeral 162 and includes a pair of king pins 164 and 166 which may be selectively inserted into a plurality of vertically aligned, upper and lower holes 168 and 170, respectively, in the plates 152 and 154. Each of the king pins 164,166 has a spring clip keeper 172 which can be inserted in a cross-hole of the pin after it has been installed in a selected vertical pair of the holes 168,170, whereby to keep the pin 164 or 166 from being accidentally jostled out of the track 150. Each of the king pins 164,166 also has a short, permanently installed cross bar 174 spaced a short distance above the location for the keeper 172 for limiting the depth of insertion of the pin into the holes 168,170, as illustrated particularly in FIGS. 12 and 13. Furthermore, each of the king pins 164,166 has a transverse, peg-like handle 176 at its upper end to facilitate manual grasping and manipulation thereof.

As the implement is being transported to and from the field, it is maintained in the transport position, as illustrated in FIG. 2, in which the ground wheels 16 and 18 are fully lowered relative to the frame 10 such that all of the deep tillage shanks 32–40 and the shallow running discs 50–56 are held up out of the ground. At this time, the wheel lift cylinders 28 and 30 are fully extended due to the selector valve 124 having been appropriately shifted by the operator. If it is desired to adjust the angle of attack of the disc gangs 50–56, such adjustment needs to be carried out at this time while the discs are out of the ground and the gangs can be easily swung through their various fore-and-aft positions of adjustment.

In order to make such angle adjustment on any one or all of the gangs 50–56, it is only necessary to approach the appropriate guide track 150 and remove one or both of the king pins 164 and 166, depending upon the current position for the gang and the ultimate position desired. With the king pins 164 and 166 removed, the block 148 is free to slide within the track 150, and such may readily be accomplished by manually grasping the outer end of the beam 60 and swinging such end either fore or aft, as may be desired, while the inner end hinges about the pivot provided by the spherical bushing 64 and pin 66. Once the selected position is achieved, it is only necessary to reinsert the king pins 164 and 166, whereupon, the adjustment is complete.

It will be noted in the preferred embodiment shown in FIGS. 11–13 that three different positions of angular adjustment are available for each of the gangs, although additional angular positions could be provided, if desired. In the illustrated embodiment, when the rearmost position of FIG. 11 is selected, the rear king pin 164 is inserted into the second set of vertically aligned holes 168,170, as numbered from the rear. On the other hand, when the block 148 is retained in its forwardmost position of FIG. 13, the front king pin 166 is inserted into the third set of vertically aligned holes 168,170. And when the block 148 is to be held in its intermediate position of FIG. 12, the rear king pin 164 is inserted in the first set of holes, while the front king pin 166 is inserted into the fourth or forwardmost set of vertically aligned holes 168,170.

With the angle of attack of the gangs decided upon, the operator may then enter the field with the machine and appropriately shift the selector valve 124 to lower the shanks 32–40 to their desired working depth by allowing the wheels 16,18 to swing upwardly toward the frame 10. This would also normally engage the disc gangs with the ground, but such depth of engagement can be readily adjusted, even after the machine has commenced tillage, by merely actuating the selector valve 136 in the appropriate direction to extend or retract the hydraulic cylinder 84. When such actuation of hydraulic cylinder 84 occurs, the motion transmitting device 92 will be rocked in the appropriate direction to correspondingly transmit raising or lowering force to the crank arms 76 associated with the various gangs. In view of the fact that all of the gangs are mechanically coupled with the device 92 through the push-pull links 102–108, such depth adjustment of all four gangs 50–56 occurs simultaneously.

As earlier explained, in the event individual calibration or adjustment of any one of the gangs 50–56 is desired relative to the others, it is a simple measure to rotate the body 110 of the appropriate link 104–108 to effectively lengthen or shorten the same by the desired amount.

It will thus be seen that the tillage implement as above described not only provides for both deep tillage of compaction zones and surface breakup with residue incorporation, but also allows the operator to quite easily control and adjust the surface action being carried out by the discs. The angle of the disc gangs can readily be adjusted to throw more or less soil for the amount of residue coverage desired, while the depth of cutting and penetration is easily changed from the tractor seat by simply manipulating the hydraulic control on the tractor. Through angle adjustment and depth changing, the operator has the ability to readily control the amount of residue left on the surface and worked into the soil in order to meet his particular conservation compliance needs.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a tillage implement having a wheeled frame, front and rear pairs of disc gangs mounted on the frame for working the soil as the implement is pulled across a field by a towing vehicle, and depth adjustment means for adjustably raising and lowering the gangs relative to the frame, the improvement comprising:

said front and rear pairs of gangs each including a left gang and a right gang, said depth adjustment means including power mechanism operable from said towing vehicle for causing all of said gangs to be adjustably raised and lowered in unison during said depth adjustment, said power mechanism including means permitting each of said gangs to be individually depth-calibrated independently of the others, said mechanism including a hydraulic actuator, a common motion transmitting device coupled with the actuator for back and forth movement along a prescribed path of travel during extension and retraction of the actuator, and four operating links for the four gangs, there being one operating link for each of said gangs respectively, said four links operably coupling the gangs with said device such that the gangs are depth-adjusted in unison by the device when the actuator is extended or retracted, each of said links including means for selectively adjusting the length of each link without causing concurrent length adjustment of the other links, whereby to permit independent depth calibration of the gangs relative to one another, said motion transmitting device being located intermediate the front and rear gangs, the pair of links for the left and right front gangs extending rearwardly from the front gangs into operable connection with the motion transmitting device, and the pair of links for the left and right rear gangs extending forwardly from the rear gangs into operable connection with the motion transmitting device.

2. In a tillage implement as claimed in claim 1, each of said links including a turnbuckle as a part thereof.

3. In a tillage implement as claimed in claim 1, each of said gangs including a horizontal beam and a series of discs extending along and supported by the beam, each beam having a horizontal pivot connection with the frame for swinging the series of discs up and down as the beam is pivoted about said connection, said power mechanism being operably coupled with said beams.

4. In a tillage implement as claimed in claim 1, said motion transmitting device being disposed in an upstanding position on said frame with a lower end pivoted to the frame and an upper end disposed to rock forwardly or rearwardly during depth adjustment.

5. In a tillage implement having a wheeled frame, front and rear pairs of disc gangs mounted on the frame for working the soil as the implement is pulled across a field by a towing vehicle, and depth adjustment means for adjustably raising and lowering the gangs relative to the frame, the improvement comprising:

said front and rear pairs of gangs each including a left gang and a right gang, said depth adjustment means including power mechanism operable from said towing vehicle for causing all of said gangs to be adjustably raised and lowered in unison during said depth adjustment, said power mechanism including means permitting each of said gangs to be individually depth-calibrated independently of the others, said mechanism including a hydraulic actuator, a common motion transmitting device coupled with the actuator for back and forth movement along a prescribed path of travel during extension and retraction of the actuator, and an operating link for each of said gangs respectively, operably coupling the gangs with said device such that the gangs are depth-adjusted in unison by the device when the actuator is extended or retracted, each of said links including means for selectively adjusting the length of each link without causing concurrent length adjustment of the other links, whereby to permit independent depth calibration of the gangs relative to one another, said device being generally inversely U-shaped, presenting a pair of generally upright legs on opposite, lateral sides of a fore-and-aft center-line of the implement and a transverse bight rigidly interconnecting said legs, said legs being pivotally connected to the frame adjacent their lower ends for rocking of the device in a fore-and-aft direction about a transverse axis during depth adjustment of the gangs.

6. In a tillage implement as claimed in claim 5, said actuator being connected to the device at said bight and said links being connected to the device at said upright legs thereof, the left front and left rear gangs being connected to a left leg of the device and the right front gang and right rear gang being connected to a right leg of the device.

7. In a tillage implement as claimed in claim 6, said frame including ground wheels under the frame movable upwardly and downwardly relative to the frame for varying the height of the latter, said ground wheels having a transverse torque tube associated therewith which rotates about its longitudinal axis during height adjustment of the frame, said device being mounted on said torque tube for carrying out said rocking motion with the axis of rocking motion of the device coinciding with the longitudinal axis of the torque tube.

8. In a tillage implement as claimed in claim 5, said frame including ground wheels under the frame movable upwardly and downwardly relative to the frame for varying the height of the latter, said ground wheels having a transverse torque tube associated therewith which rotates about its longitudinal axis during height adjustment of the frame, said device being mounted on said torque tube for carrying out said rocking motion with the axis of rocking motion of the device coinciding with the longitudinal axis of the torque tube.

9. In a tillage implement having a wheeled frame, front and rear pairs of disc gangs mounted on the frame for working the soil as the implement is pulled across a field by a towing vehicle, and depth adjustment means for adjustably raising and lowering the gangs relative to the frame, the improvement comprising:

said front and rear pairs of gangs each including a left gang and a right gang, said depth adjustment means including power mechanism operable from said towing vehicle for causing all of said gangs to be adjustably raised and lowered in unison during said depth adjustment, said power mechanism including means permitting each of said gangs to be individually depth-calibrated independently of the others, each of said gangs including a horizontal beam and a series of discs extending along and supported by the beam, each beam having a horizontal pivot connection with the frame for swinging the series of discs up and down as the beam is pivoted about said connection, said power mechanism being operably coupled with said beams, said pivot connection for each beam including a pair of axially aligned, inner and outer horizontal pivots at spaced locations along the beam, the inner pivot of each pair having means associated therewith for permitting the outer horizontal pivot to swing fore-and-aft with the beam about an upright axis for angle adjust of the gangs, said beam having selectively releasable retaining means locking the beam to the frame in a selected position of angular adjustment.

10. In a tillage implement as claimed in claim 9, each of said outer horizontal pivots having a support block associated therewith, said frame having guide means for confining the block during depth adjustment and in all positions of angle adjustment.

11. In a tillage implement as claimed in claim 10, said guide means including a pair of superimposed, vertically spaced apart plates trapping said support block therebetween, said retaining means including a fore-and-aft series of holes in said plates and removable pin means insertable into selected ones of said holes in accordance with the selected angular position of the gang.

12. In a tillage implement as claimed in claim 11, said inner horizontal pivot including a rigid, horizontal stub shaft held by the frame against fore-and-aft movement and a self-aligning spherical bearing on the beam received on the stub shaft in a manner to permit limited fore-and-aft pivoting movement of the beam relative to the stub shaft during angle adjustment and free up and down swinging movement of the beam during depth adjustment.

13. In a tillage implement having a wheeled frame for connection to a towing vehicle and front and rear pairs of left and right disc gangs having both angle adjust and depth adjust means, the improvement comprising:

each of said gangs including means presenting an upright pivot axis generally adjacent an inboard end of the gang whereby to permit an outboard end of the gang to swing fore-and-aft for angle adjust, each of said gangs having means for releasably retaining the gang in a selected position of angular adjustment, said depth adjust means including push-pull operating linkage coupled with each gang respectively at a point generally aligned vertically with said pivot axis whereby fore-and-aft swinging of a gang about said pivot axis during angle adjust does not affect the position of said linkage for depth adjust.

14. In a tillage implement as claimed in claim 13, said means presenting an upright pivot axis for each gang including a horizontal stub shaft and a self-aligning spherical bushing on the stub shaft attaching the gang to the frame for both up and down and fore-and-aft swinging movement.

15. In a tillage implement as claimed in claim 14, said depth adjust means further including a single hydraulic actuator operable from the towing vehicle, and a motion transmitting device operably coupled with the actuator for movement thereby, the linkages of said gangs being connected to said device for operation thereby in unison.

16. In a tillage implement as claimed in claim 13, each of said gangs having a support block spaced outwardly from the means presenting the upright pivot axis of the beam, said frame being provided with a pair of superimposed, vertically spaced apart plates for each support block confining the block therebetween during fore-and-aft movement of the block in connection with angle adjusting movement of the gangs, said retaining means including structure for releasably locking the block in a selected position of fore-and-aft movement in the plates.

17. In a tillage implement as claimed in claim 16, each of said gangs being provided with an inner horizontal pivot and an axially aligned, outwardly spaced, outer horizontal pivot to provide up and down pivoting movement of the gang during depth adjustment relative to the frame, said outer horizontal pivot being located in said block.

18. In a tillage implement having a mobile frame and at least one gang of discs for working the soil as the implement is advanced, said disc gang projecting outwardly from the frame at an angle thereto and being adjustable in a fore-and-aft direction relative to the frame for varying said angle, the improvement comprising:

upright pivot means adjacent an inner end of the gang adapting the gang for fore-and-aft swinging movement about an upright axis to effect said angle adjustment;

a pair of superimposed, vertically spaced apart, guide plates on said frame spaced outwardly from said upright pivot means;

a block secured to the gang and received between the plates for guiding the gang during its swinging movement; and releasable retaining means for locking the block in a selected position within the plates whereby to hold the gang in a selected position of angular adjustment.

19. In a tillage implement as claimed in claim 18, said releasable retaining means including aperture means in the plates and locking pin means removable insertable in said aperture means.

20. In a tillage implement as claimed in claim 19, said pin means including a pair of pins positionable in apertures on opposite fore-and-aft sides of the block for capturing the block against movement.

21. In a tillage implement as claimed in claim 20, each pair of said plates being provided with a pair of opposite end walls limiting fore-and-aft movement of the corresponding guide block, said aperture means including a pair of apertures positioned to selectively receive a pin for trapping the block against one or the other of said end walls.

22. In a tillage implement as claimed in claim 18, said upright pivot means and said block of the gang having horizontal pivot means associated therewith for allowing the gang to be adjustably swung up and down relative to the frame for depth adjustment; and power means operably remotely from a vehicle towing the implement and coupled with the gang for effecting said depth adjustment.

23. In a tillage implement as claimed in claim 18, said upright pivot means and said block of the gang having horizontal pivot means associated therewith for allowing the gang to be adjustably swung up and down relative to the frame for depth adjustment; and power means operable remotely from a vehicle towing the implement and coupled with the gang for effecting said depth adjustment.

* * * * *